US008510664B2

(12) United States Patent
Rueben et al.

(10) Patent No.: US 8,510,664 B2
(45) Date of Patent: Aug. 13, 2013

(54) METHOD AND SYSTEM FOR DISPLAYING EMAIL THREAD INFORMATION

(76) Inventors: Steven L. Rueben, Las Vegas, NV (US); Gabriel Jakobson, Las Vegas, NV (US)

( * ) Notice: Subject to any disclaimer, the term of this patent is extended or adjusted under 35 U.S.C. 154(b) by 880 days.

(21) Appl. No.: 12/231,698

(22) Filed: Sep. 6, 2008

(65) Prior Publication Data

US 2010/0076989 A1    Mar. 25, 2010

(51) Int. Cl.
*G06F 3/00* (2006.01)
*G06F 3/048* (2006.01)
*G06F 15/16* (2006.01)
*G06F 3/14* (2006.01)

(52) U.S. Cl.
USPC ............ 715/752; 709/206; 715/764; 715/853

(58) Field of Classification Search
USPC ........................ 715/752; 358/402; 379/93.24
See application file for complete search history.

(56) References Cited

U.S. PATENT DOCUMENTS

| | | | |
|---|---|---|---|
| 6,460,074 B1 * | 10/2002 | Fishkin .................... | 709/206 |
| 6,484,196 B1 | 11/2002 | Maurille | |
| 6,539,421 B1 | 3/2003 | Appelman | |
| 6,671,718 B1 * | 12/2003 | Meister et al. ............. | 709/206 |
| 6,917,965 B2 | 7/2005 | Gupta | |
| 7,185,059 B2 | 2/2007 | Danielle | |
| 2002/0156909 A1 * | 10/2002 | Harrington ................. | 709/231 |
| 2003/0101065 A1 * | 5/2003 | Rohall et al. .................. | 705/1 |
| 2003/0154212 A1 * | 8/2003 | Schirmer et al. .......... | 707/103 R |
| 2003/0163537 A1 * | 8/2003 | Rohall et al. ................. | 709/206 |

OTHER PUBLICATIONS

"Thread Arcs: An Email Thread Visualization", Bernard J. Kerr, IBM Research Report, Jul. 22, 2003 (Kerr).*
"Gmail gets new features", by David Chartier on Nov. 10, 2006, downloaded Apr. 25, 2011.*

* cited by examiner

*Primary Examiner* — Namitha Pillai
*Assistant Examiner* — Paul Thatcher

(57) ABSTRACT

A method and apparatus for discerning and displaying an email-thread chart of senders and recipients ("senders/recipients") included in an email thread, are disclosed. The email-thread chart may include the senders/recipients arranged in chronological order matching the order in which individual related emails, included in the email thread, were sent and received (the sending/receiving of related emails is hereinafter referred to as "transactions"). The email-thread chart may further include the date-and-time-stamp of the transactions and the labeling of the transactions by transaction type (e.g. "Cced", "forwarded", "replied", etc.) The senders/recipients may be discerned from the body of the email. The body of the email may contain quoted text containing the email thread. The email-thread chart may be displayed automatically in response to a user's attempt to send the email to a remote user, or in automatic response to any other user action. The email-thread chart may include a graphical user interface ("GUI") and may allow the user to select one of the senders/recipients displayed, and to perform numerous functions related to the selected senders/recipients (e.g. delete all references to the selected sender/recipient from the email thread, etc.)

14 Claims, 20 Drawing Sheets

METHOD AND SYSTEM FOR DISPLAYING EMAIL THREAD INFORMATION

FIELD OF INVENTION

The present invention relates to the field of electronic mail ("email") over electronic communication systems. More particularly, the present invention provides various methods, systems and apparatus for discerning senders and recipients ("senders/recipients") of related emails, included in an email thread, and displaying the senders/recipients in various ways, such as graphically, chronologically, etc.

BACKGROUND OF THE INVENTION

Email is a store-and-forward method of composing, sending, receiving and storing messages over electronic communication systems. Email messages consist of two major sections: a message header ("header")—structured into fields such as summary, sender, receiver, and other information about the e-mail, and a message body ("body")—the message itself as unstructured text. The header consists of fields, usually including at least the following: "From:" (i.e the e-mail address, and optionally the name of the sender), "To:" (i.e. the e-mail address[es], and optionally name[s] of the message's recipient[s]), "Subject:" (i.e. a brief summary of the contents of the message) and "Date:" (e.g. the local time and date when the message was written.) Other common header fields include "Cc:" (i.e. carbon copy/address of another recipient), "Bcc:" (i.e. blind carbon copy so the recipient cannot be seen by other recipients), "Received:" (i.e. tracking information generated by mail servers that have previously handled a message), "Content-Type:" (i.e. information about how the message has to be displayed, usually a MIME type), "Reply-To:" (i.e. address that should be used to reply to the sender), "References:" (i.e. message-id of the message that this is a reply to, and the message-id of this message, etc.), "In-Reply-To:" (i.e. message-id of the message that this is a reply to.) Other header field may be used in other embodiments and new header fields may be defined and implemented in time.

Email messages received are frequently forwarded on to other recipient(s). For example, a first email recipient may forward an email to a second recipient; or the first email recipient may reply to the email and carbon-copy one or more other recipients. The body of the email commonly contains one or more headers from previous iterations of the email (i.e. same email being sent and received multiple times.) For example, an email sent by a User A to a User B, contains "From: User A" and "To: User B" in its header. As the email is forwarded on from User B to a User C, the new header is "From: User B" and "To: User C"; however, the body of the email now contains the original header "From: User A To: User B". Thus the final recipient, User C, may be able to see the original email sent by User A, as the original email is embedded in the body of the new email. Itterations of an email—or related emails—embedded in an email, are referred to as an email trail. It is a common practice for users to read the contents of an email and manually scan the email trail for previous senders and copies of those senders' emails. On smaller electronic devices (e.g. cellular phones, PDAs, etc.) with limited display size, a user may be need to perform a burdensome amount of scrolling to locate and review all senders/recipients included in an email trail within an email.

SUMMARY OF THE INVENTION

The present invention provides various methods, systems and apparatus for discerning senders and recipients ("senders/recipients") of related emails, included in an email thread, and displaying the senders/recipients. In one possible embodiment, the information including the discerned senders/recipients may be displayed in chronological order, for example the chorological order in which the related emails had been sent and received among the senders/recipients. The information displayed may also include additional information, such as the dates associated with the sending/receiving (the sending/receiving of related emails is hereinafter referred to as "transactions"). The additional information may also include snippets of content added by each sender/recipient, subject lines, etc. In another embodiment the information may be displayed as a diagram, through graphical representation of the senders/recipients and the chronology of the transactions. The user may be able to select a sender/recipient, or information associated with a transaction involving one or more senders/recipients, and select a list of associated actions. The associated actions may include the ability to automatically delete references to the selected sender/recipient from the email, delete all email transactions associated with the selected sender/recipient, obtain and display information associated with the selected sender/recipient (e.g. information obtained from other sources such as systems of record), scroll the email to a specific transaction involving the selected sender/recipient, etc. In another embodiment, an email-related action, e.g. a "send" command intended to transmit the email, may trigger a process whereby the transmission of the email may be halted, the user may be displayed information associated with senders/recipients; and, an input from the user may be required to resume the transmission of the email. In another embodiment, an action such as "send" may be halted, senders/recipients may be discerned from the email and compared against another list of users and, based on the outcome of the comparison, the transmission of the email may either be resumed, or the user may be displayed the information associated with the senders/recipients and be required to manually resume the send action.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1:
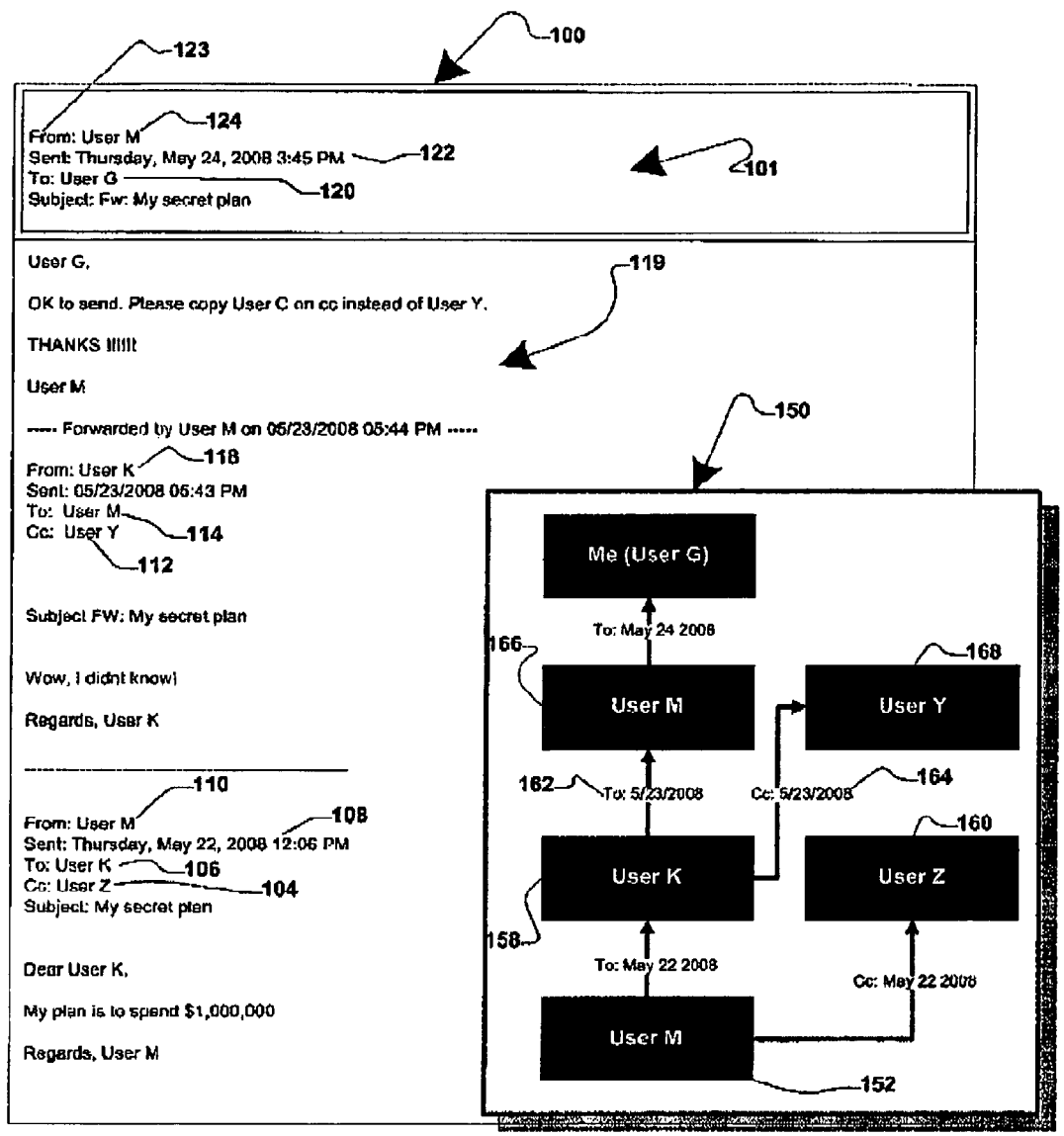
FIG. 1 is a generalized block diagram illustrating the display of senders/recipients of an email, according to one embodiment of the present invention.

FIG. 1 is a generalized block diagram illustrating detecting and displaying senders/recipients of an email, according to one embodiment of the present invention. An email 100 may be displayed by an electronic device (e.g. a personal computer, a cellular phone, a PDA, a home entertainment system, or any other device capable of displaying emails.) The email 100 may be displayed by an email application (e.g. Microsoft Outlook®, Lotus Notes®, iPhone® email application, Android™-based email application, RIM® email application, Palm® email application, etc.) on the electronic device; or via a web-browsing application interfacing with an email portal (e.g. GMail®, Yahoo!® mail, hotmail®, etc.); or by any other method of displaying email by an electronic device.

The email 100 may include a header section 101, which included information on the current sender and recipient(s) of the email 100. For example, the sender is a "User M" 124 and may be identified by a form-field term "From:" 123, which may precede the name of the sender 124.

Form-field terms may be any combination of characters (e.g. English words such as "From:", "Sender:", "To:", "Recipient:", non-English word equivalents, etc.) generally identified by email systems as preceding the email and/or name of a sender or recipient(s) of an email.

The header section 101 may also include the name of the recipient "User G" 120, preceded by the form-field term "To:". The header section 101 may also include a date-and-time stamp "Thursday, May 24, 2008 3:45 PM" 122, preceded by the form-field term "Sent:".

The email 100 may contain an email thread 119 of related emails, sent among various senders/recipients, included in the body of the email 100. For example, a sender "User M" 110 had sent an email (i.e a previous version of the email 100 as text may be added to an email as it is sent among senders/recipients) to senders/recipients "User K" 106 and "User Z" 104 on "Thursday, May 22, 2008 12:06 PM" 108. In the prior art, a user needs to read the contents of the email 100 and visually identify senders/recipients embedded in the email trail 119.

In one preferred embodiments of the present invention, an email-thread chart 150 may be displayed in conjunction with the email 100. The email-thread chart 150 may be a window, an application, another instance of a running application, a modal dialog, a modeless dialog, an applet, a web browser, etc. The email-thread chart 150 may contain a graphical representation of the senders/recipients contained in the email thread 119, and the chronology of the sending/receiving operations.

The email-thread chart 150 may be a block diagram. Every sender/receiver identified in the email thread 119 may be displayed in a block labeled with the sender/receiver's name. The blocks may be arranged in a chronological order (e.g. the earliest email at the bottom and the latest at the top), with line connectors (e.g. arrows) connecting the blocks. The line connectors may also include date-and-time stamps indicating when an associated sending/receiving occurred.

For example, a block labeled "User M" 152 at the bottom of the email-thread chart 150, may correspond to the earliest transaction included in the email thread 119 the sender "User M" 110, preceded by a "From:" form-field term, sending an email to the senders/recipients "User K" 106 and "User Z" 104 (preceded by the form-field terms "To:" and "Cc:", respectively.) This email transaction may be reflected in the email-thread chart 150 which includes the block labeled "User M" 152 and line connectors connecting and pointing to blocks labeled "User K" 158 and "User Z" 160. The block "User M" 152 may correspond to the sender "User M" 110 in the email thread 119. The blocks "User K" 158 and "User Z" 160 may correspond to the recipients "User K" 106 and "User Z" 104, respectively, in the email thread 119.

Similarly, blocks "User M" 166 and "User Y" 168 correspond to the senders/recipients "User M" 114 and "User Y" 112, respectively, in the email thread 119.

In the presently-preferred embodiment, in the email-thread chart 150, blocks representing an email recipient CCed on an email, may be displayed differently from blocks representing an email recipient included in the "send to:" form field of an email. For example, in the email thread 119, a "User K" 118 is shown to have sent an email to the "User M" 114 (as the "User M" 114 is preceded by a "To:" form-field term), while CCing the "User Y" 112 (as the "User Y" 112 is preceded by a "Cc:" form-field term.)

Accordingly, in the email-thread chart 150, the block "User K" 158 may be linked to the block "User M" 166 by a straight, vertical arrow, while the block "User K" 158 may be linked to the block "User Y" 168 by a sideways arrow. Further, the arrows may be labeled with corresponding form-field terms and date/time stamps. E.g. "To: 5/23/2008" 162, on the arrow linking the blocks "User K" 158 and "User M" 166, indicates that "To:" was the inclusion method of User M in the email from User K. "Cc: 5/23/2008" 164, on the arrow linking the blocks "User K" 158 and "User Y" 168, indicates that "Cc:" was the inclusion method of User Y in the email from User K.

In alternate embodiments, the email-thread chart 150 may be a flow chart, a text-based list, etc. The senders/recipients displayed in the email-thread chart 150, as well as the arrows denoting the transactions, may be displayed in various ways. For example, the name of a sender/recipient may be displayed in a different color if a record of the sender/recipient exists in the user's date store (e.g. in an electronic address book.) The user may be able to access stored information associated with a sender/recipient displayed in the email-thread chart 150. Different blocks, shapes, colors, graphics, etc. may be used to delineate different types of email inclusions. For example, a block corresponding to a recipient CCed on an email may be displayed in a different color from a block corresponding to a recipient included in an email by the form-field term "To:".

Figure 2A:
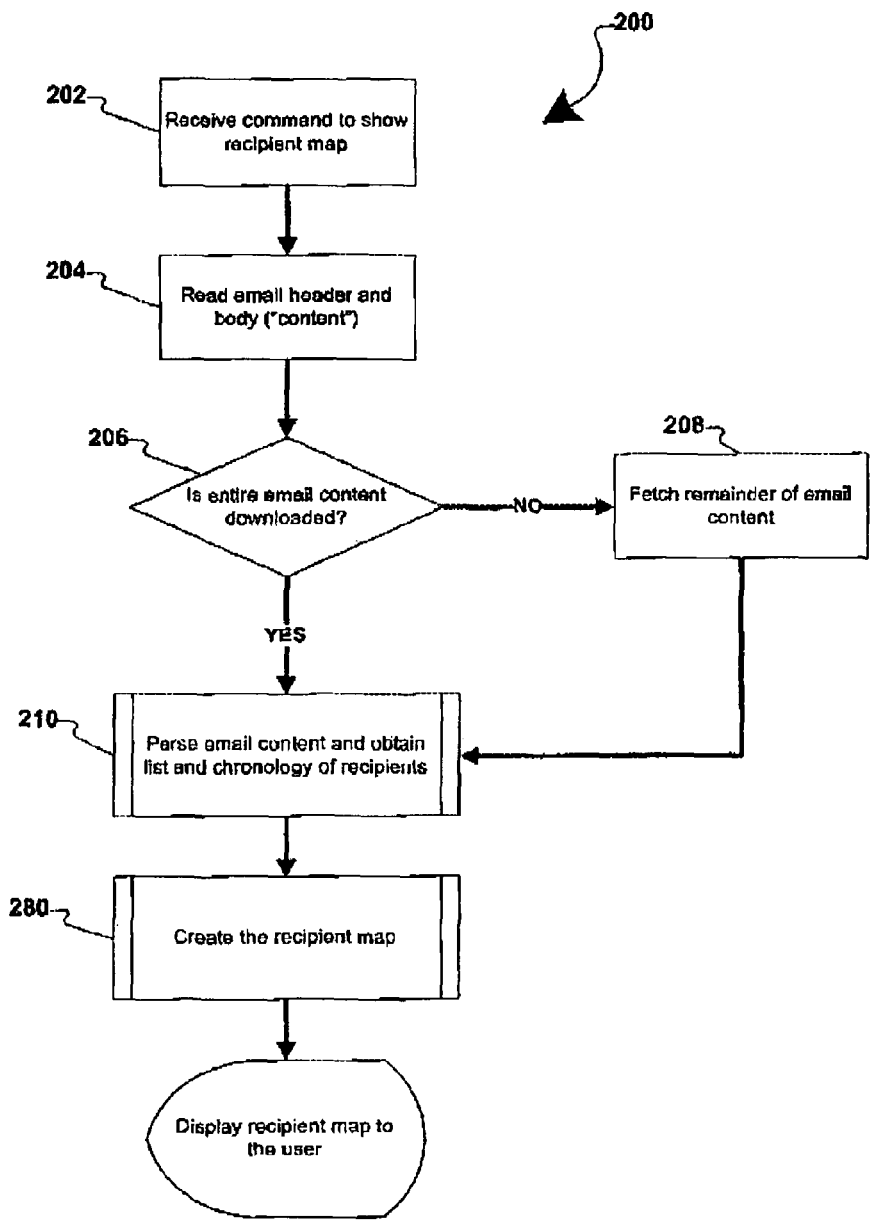
FIGS. 2A and 2B are generalized flow diagrams illustrating reading and displaying an email-thread chart of senders/recipients of an email, in response to a command, according to one embodiment of the present invention.
Figure 2B:
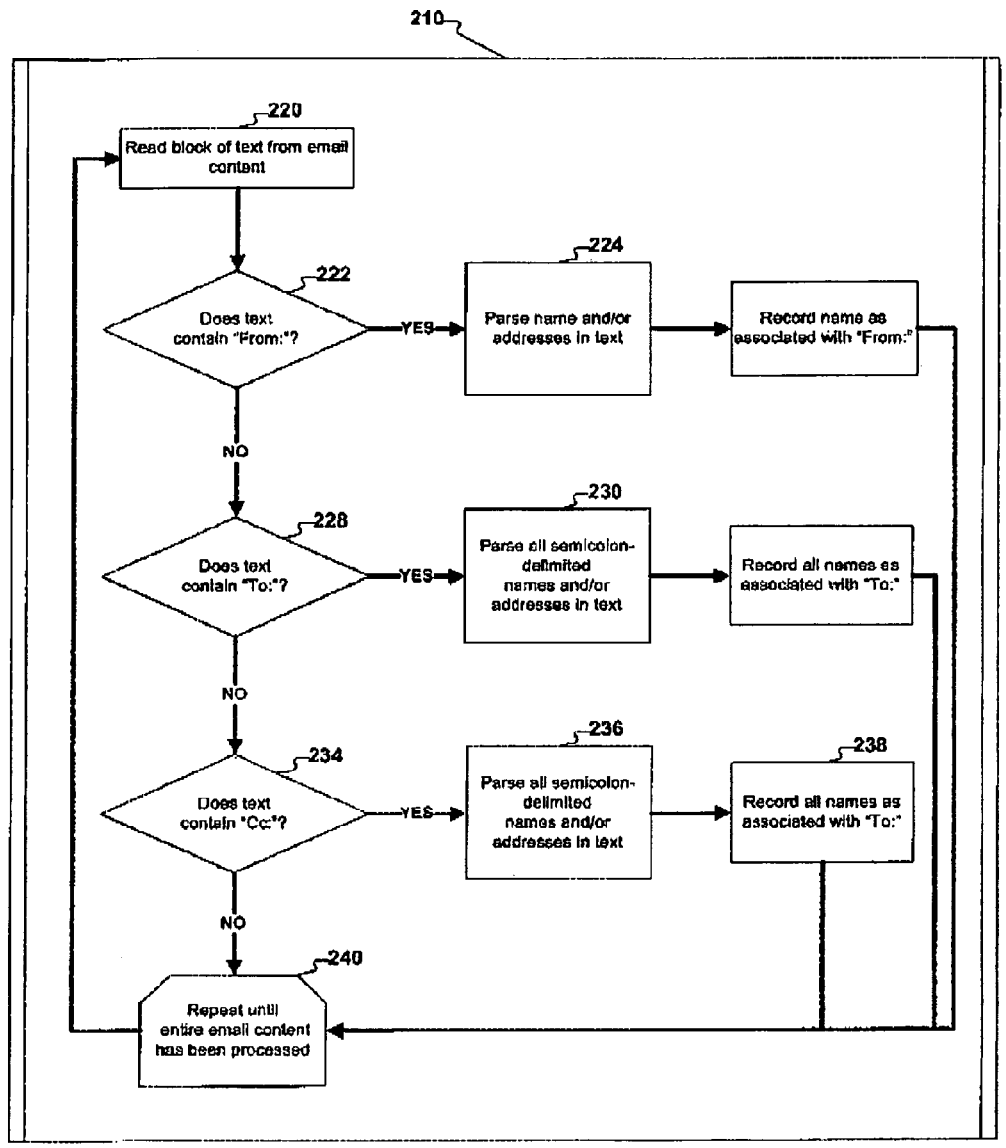

FIGS. 2A and 2B are generalized flow diagrams illustrating reading and displaying an email-thread chart of senders/recipients of an email, in response to a command, according to one embodiment of the present invention. Flow diagram 200 may be executed by an electronic device, connected to an email system, in response to a command from a user. For example, the user may click a button, labeled "Map Recipients" in an email application displaying an email. In another embodiment, the user may click a button or make a selection of a sender/email-thread charting-command in relation to a selected email. For example, the user may highlight an email from a list of emails and invoke the command (e.g. by clicking on a pointing device, by touching a touch screen, via a keyboard input, via a voice command, or by any other method of input.)

Referring to FIG. 2A, in response to receiving a sender/email-thread charting-command at step 202, at step 204 the header and body of the email may be read (i.e. examined and processed.) At step 206 it may be determined whether the entire body of the email is available (i.e. has been retrieved). In some electronic systems and on some devices (e.g. RIM® handheld devices and other cellular phones) only a portion of the email's content (e.g. the header and a portion of the email's body) are downloaded from a network and/or displayed to the user. An additional command may be needed to be executed to retrieve the remainder of the email content from the network. If at step 206 it is determined that not all the content of the email had been downloaded, at step 208 the remainder of the email content may be downloaded.

At step 210, the email content may be parsed to obtain a list of senders/recipients and a chronology of transactions (i.e. when was each of the emails, contained in the email trail, sent, by whom and to whom.) At step 280, the email-thread chart may be created from the information parsed and gathered at step 210. Please refer to FIG. 2B for more detail on the creation of the email-thread chart.

Referring now to FIG. 2B, step 210 (equivalent to step 210 in FIG. 2A) is illustrated as a series of smaller steps 220-240. At step 220, a block of text (e.g. a line of text or any string of characters or bytes) may be read from the content of the email. For example, the top/first line of text of the header of the email, may be read. At steps 222, 228 and 234, it may be determined if certain key words (also referred to as email terms) are contained in the block of text.

At step 222, it may be determined whether the key word "From:" is contained in the block of text. If it is determined that the key word "From:" is contained in the block of text, at step 224, the remainder of the block of text may be parsed and all sender/recipient names and/or email addresses may be extracted. (E.g. emails may contain a sender list, preceded by the key word "From:" where sender names and/or sender email addresses are included. Sender names and sender email addresses are typically delimited by well-known and universally-accepted characters, such as "[ ]", ",", ";", etc. ) At step 226, the sender name and/or email address, extracted at step 224, may be recorded for use in the email-thread chart.

If at step 222 it is determined that the key word "From:" is not contained in the block of text, at step 228, it may be determined whether the key word "To:" is contained in the block of text. If it is determined that the key word "To:" is contained in the block of text, at step 230, the remainder of the block of text may be parsed and all the sender/recipient names and/or email addresses may be extracted. (E.g. emails may contain a recipient list, preceded by the key word "To:" where recipient names and/or recipient email addresses are included. Recipient names and recipient email addresses are typically delimited by well-known and universally-accepted characters, such as "[ ]", ",", ";", etc. ) At step 232, the recipient names and/or email addresses, extracted at step 230, may be recorded for use in the email-thread chart.

If at step 228 it is determined that the key word "To:" is not contained in the block of text, at step 234, it may be determined whether the key word "Cc:" is contained in the block of text. If it is determined that the key word "Cc:" is contained in the block of text, at step 236, the remainder of the block of text may be parsed and all the sender/recipient names and/or email addresses may be extracted. (E.g. emails may contain a recipient list, preceded by the key word "Cc:" where recipient names and/or recipient email addresses are included. Recipient names and recipient email addresses are typically delimited by well-known and universally-accepted characters, such as "[ ]", ",", ";", etc. ) At step 238, the recipient names and/or email addresses, extracted at step 236, may be recorded for use in the email-thread chart.

At step 240 it may be determined whether the entire email content has been read and processed at steps 220 to 238. If it is determined at step 240 that not entire email content has been processed, step 220 may be repeated, reading the next block of text from the email. In alternate embodiments (e.g. to support different languages such as non-English languages based on double-byte), different algorithms may be used to parse the body of the email and discern the list of senders/recipients and the chronology of the transactions.

Figure 3A:
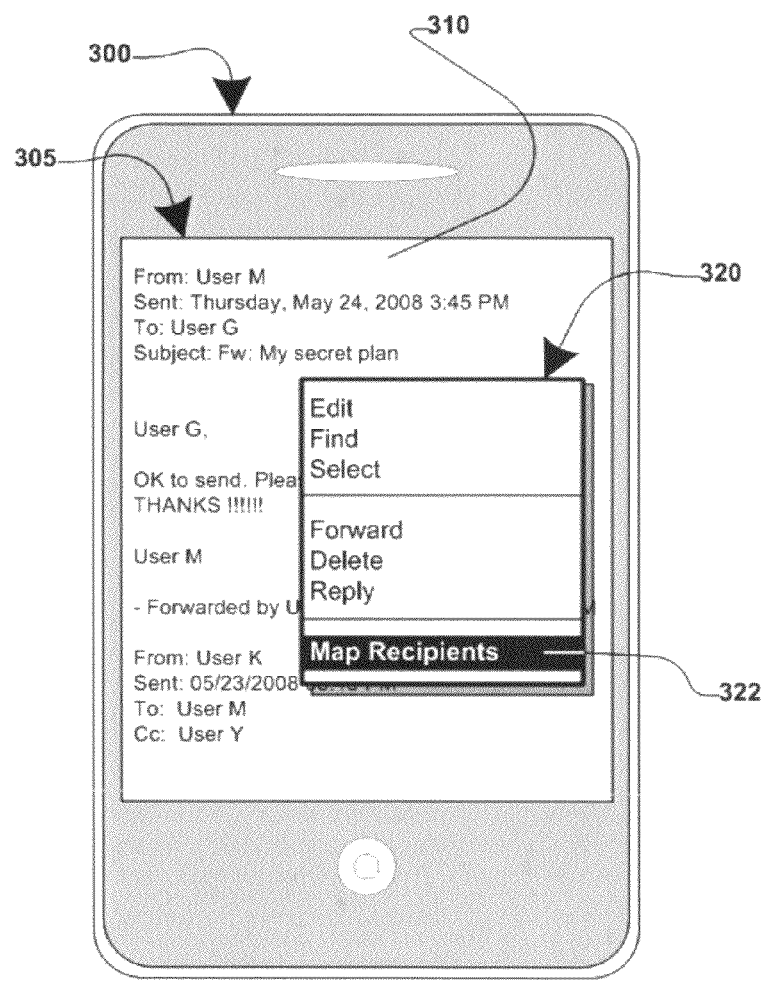
FIGS. 3A, 3B and 3C are a generalized block diagrams illustrating displaying an email-thread chart on a mobile device (or any electronic device with a smaller display area) according to one embodiment of the present invention.
Figure 3B:
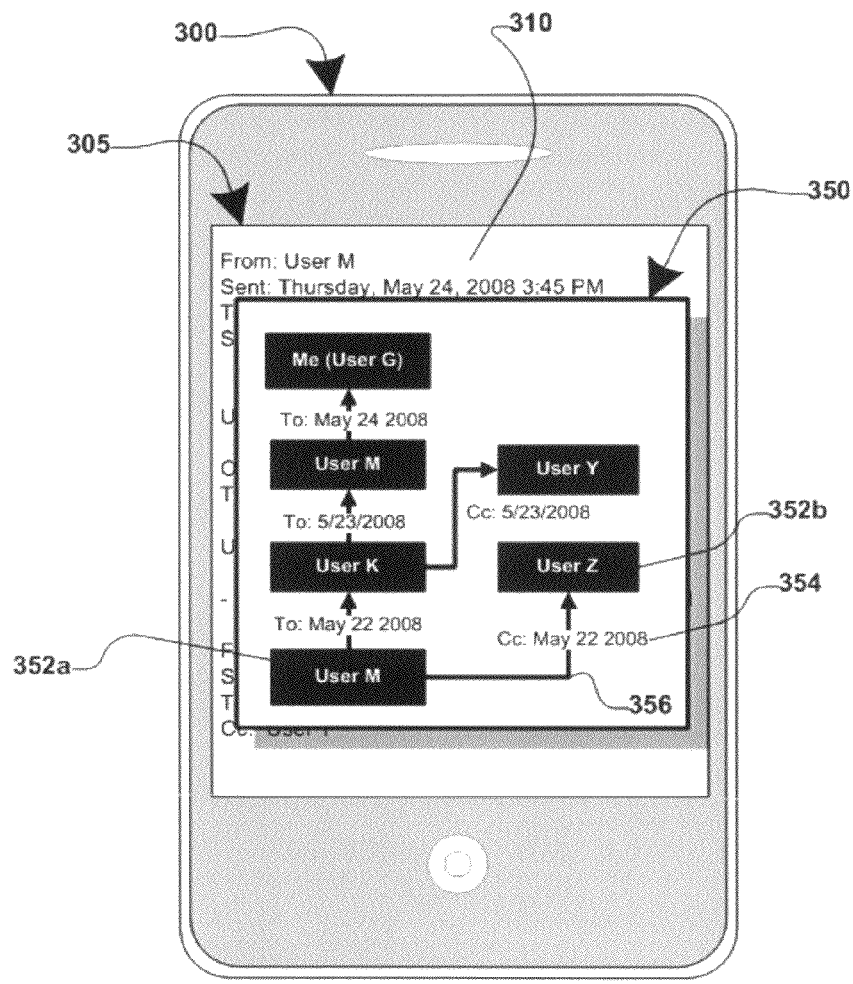
Figure 3C:
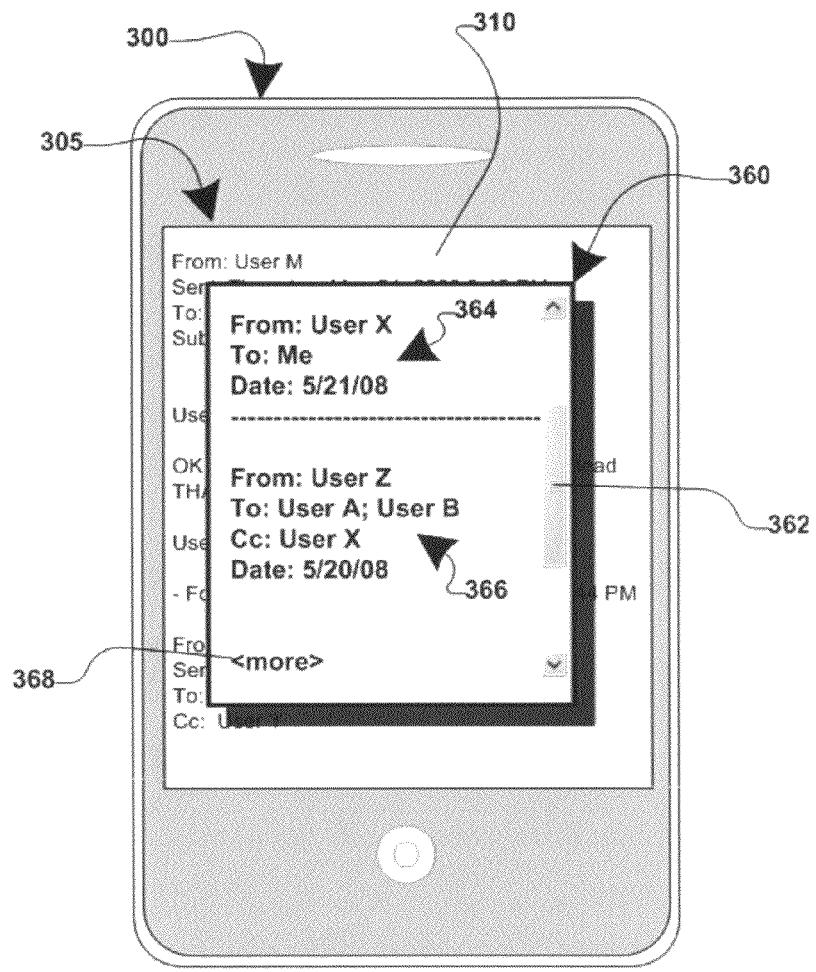

FIGS. 3A, 3B and 3C are a generalized block diagrams illustrating displaying an email-thread chart on a mobile device (or any electronic device with a smaller display area) according to one embodiment of the present invention. Mobile devices are used extensively for electronic communication, including email. A smaller display area often necessitates a user to scroll extensively through an email to discern senders/recipients included in the email.

Referring to FIG. 3A, an electronic mobile device 300 may display an email 310 on a display 305. The email 310 may contain reference to senders/recipients (typically embedded within the contents of the email 310, for example, resulting from related emails being transmitted among the senders/recipients, with a transmission trail/email-trail embedded within the contents of the email 310.)

Context menus are used to allow a user to select and invoke a function. A context menu 320 may be displayed on the display 305 of the mobile device 300 (e.g. in response to a user's command to invoke the context menu 320, such as the push of a button or key, tapping on the screen of the mobile device, via a voice command, etc.) In the prior art, the context menu 320 may include common functions associated with email, such as "Edit", "Forward", "Delete", etc.

In the presently-preferred embodiment of this invention, the context menu 320 may contain a command to display information on the senders/recipients of the email 310. For example, the command "Map Recipients" 322 may be contained in the context menu 320. The user may select the command "Map Recipients" 322 in the same manner they select any command in any context menu (e.g. by clicking, by scrolling, by touching, via a voice command, etc.)

In response to the user's selection of the "Map Recipients" command 322, referring now to FIG. 3B, an email-thread chart 350 may be displayed on the display 305. The email-thread chart 350 may contain a block diagram representing the senders/recipients discerned from content the email 310, the chronology of email transactions among the senders/recipients; and any additional information, such as dates of the email transactions, subject lines, etc.

The email-thread chart 350 may include graphics, such as blocks (or any other graphical shape) 352a and 352b. The blocks 352a and 352b may include text, e.g. "User M" and "User Z", respectively. The text on the block may reference a sender/recipient involved in a single transaction. Arrows may connect the blocks, associating the blocks with each other and indicating the direction of the transaction. For example, an arrow 356 may connect the blocks "User A" 352a and "User Z" 352b. The direction of the arrow 356 may indicate that "User A" has sent an email to "User Z". A transaction text "Cc: May 22, 2008" 354 may be displayed in close proximity to the arrow 356, indicating the date/timestamp of the associated transaction.

In alternate embodiments, the graphics associated with the email-thread chart 350 may vary. For example, the blocks 352a and 352b may be in different shapes, colors (e.g. in response to various conditions, such a sender/recipient's relationship to the user of the device 300), be composed of images (e.g. an image of the sender/recipient associated with the block), etc.

Referring now to FIG. 3C, in an alternate embodiment, an email-thread chart 360, displayed on the display 305 of the mobile device 300, may include a text-based representation of the senders/recipients, and the chronology of the transactions, contained in the email 310.

The email-thread chart 360 may include segments of the email 310. The segments 364 and 366 (also each representing an email transaction) may include information pertaining to the senders/recipients and the email transactions embedded in the email 310. For example, the segment 364 may include information such as "From: User X, To: Me, Date: 5/21/2008" and the segment 366 may include information such as "From: User Z, To: User A; User B, Cc: User X, Date: 5/20/2008".

The data included in the segments 364 and 366 may be summarized and may include information that pertains to the senders/recipients and dates of the email transactions. In other embodiments, additional data may be included.

The order of the segments 364 and 366 may be chronological, for example with the earliest transaction 364 (e.g,. based on the date/time stamp) displayed above the later transaction 366. An indication for more data (e.g. the word "<more>" 368) may be displayed. The user may scroll down (e.g. using a scrollbar 362) to retrieve additional information from earlier transactions.

In alternate embodiments, an email-thread chart may include characters and graphical representation localized to a specific language or to any other user preferences. The email-thread chart may be displayed automatically as part of an open email or as part of a context menu associated with an email.

FIGS. 4A, 4B, 4C and 4D are generalized flow diagrams illustrating the display of senders/recipients of an email prior to the sending of the email, according to various presently-preferred embodiments. In response to receiving a user's command to send the email, transmission of the email may be paused and the user may be displayed an email-thread chart. The user may be able to cancel the transmission of the email, remove one or more senders/recipients, referenced in the email-thread chart, from the list of the senders/recipients, etc.

Figure 4A:
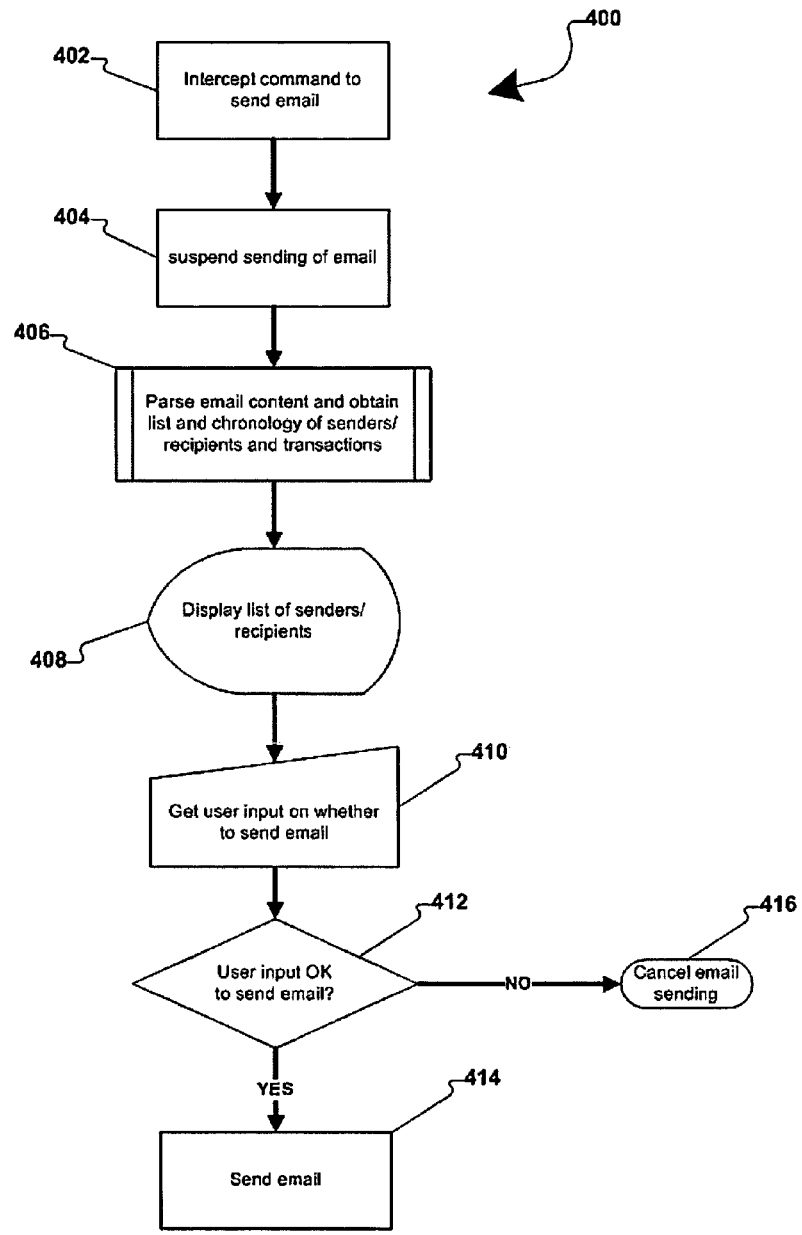
FIGS. 4A, 4B, 4C and 4D are generalized flow diagrams illustrating the display of senders/recipients of an email prior to the sending of the email, according to various presently-preferred embodiments.

Referring to FIG. 4A, flow diagram 400 illustrates an embodiment wherein an email-thread chart is displayed to the user prior to transmission of an email. At step 402, a command to commence the sending of the email (e.g. the user clicking a "send" button) may be intercepted. At step 404, the transmission of the email may be suspended.

At step 406, the email may be parsed to discern senders/recipients and chronology of transactions—from the contents of the email. Various methods, discussed in other figures, may be used to discern the sender/recipient-related information and transactional information from the email.

At step 408, the sender/recipient-related information and transactional information may be displayed to the user. In various embodiments, discussed throughout this document, the information may be displayed to the user as graphics, or text, or a combination, in a pop-up window, in a separate instance of a web-browsing application, etc.

As step 410, the user may select an option to proceed with the sending of the email; or, the user may select to cancel the sending of the email. If the option to cancel the sending of the email is selected, at step 416 the email transmission may be cancelled. In alternate embodiments, various other options may be made available to the user.

If at step 412 it is determined that the user had opted to proceed with the transmission of the email, at step 414 the transmission of the email may resume.

Figure 4B:
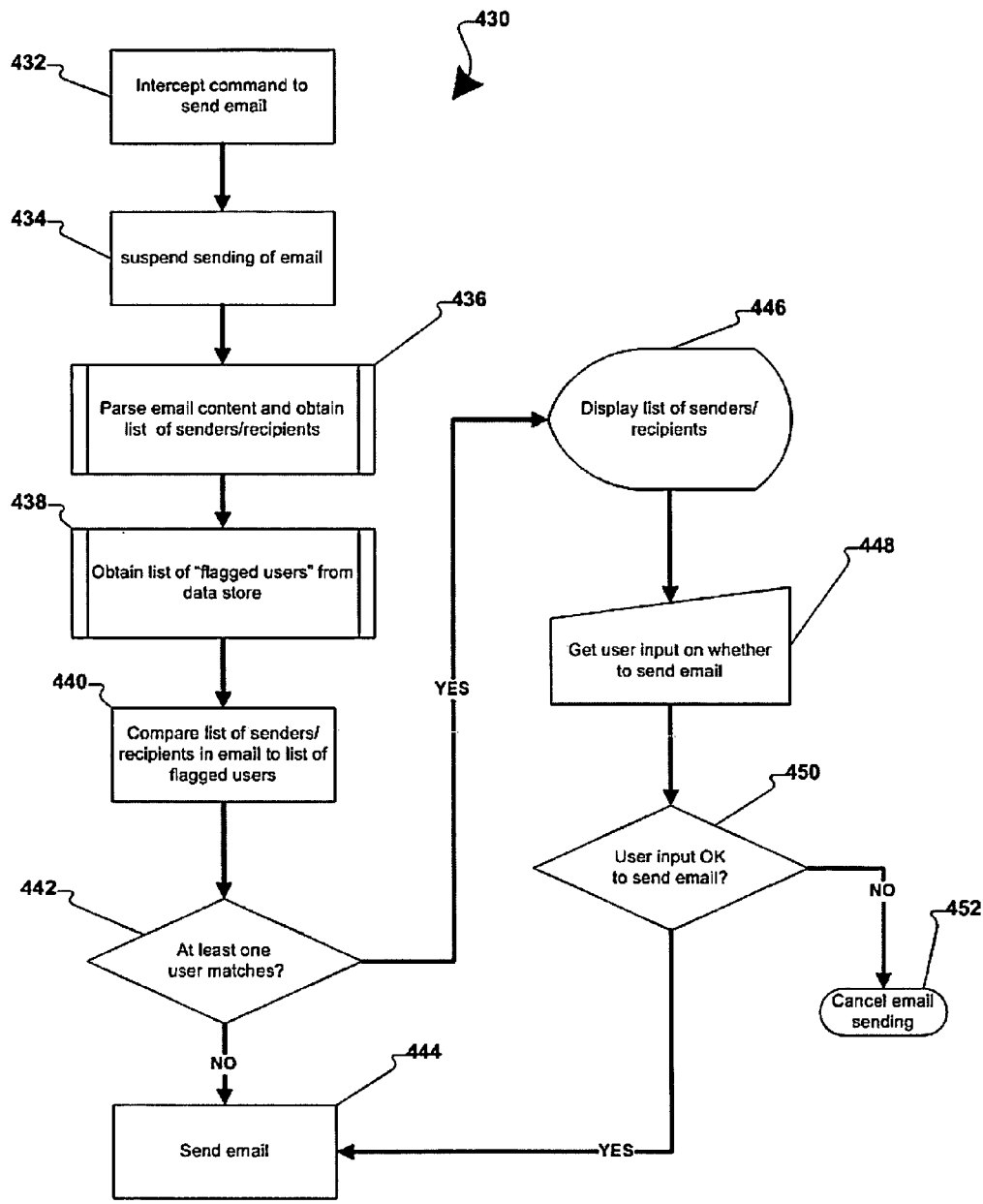

In an alternate embodiment, referring now to FIG. 4B, the transmission of the email me be interrupted, and the user may be displayed the senders/recipients list, if various criteria are met. For example, as illustrated in flowchart 430, a list of senders/recipients may be compiled and compared against a stored list of users, and if at least one user from both lists matches, the user may be displayed a list of one or more of the senders/recipients.

At step 432, a command to commence the sending of the email (e.g. the user clicking a "send" button) may be intercepted. At step 434, the transmission of the email may be suspended.

At step 436, the email may be parsed to discern senders/recipients and chronology of transactions-from the contents of the email. Various methods, discussed in other figures, may be used to discern the sender/recipient-related information and transactional information from the email.

As step 438, a secondary list of users ("flagged users") may be obtained from a data store. For example, the flagged users may be users of special importance to the user sending the email, such as executive staff in a corporation.

At step 440, A comparison may be made between the senders/recipients obtained at step 436 and the flagged users obtained at step 438. At step 442 it may be determined if at least one user from the senders/recipients matches at least one flagged user. If at step 442 it is determined no senders/recipients user matches any flagged user, at step 444 the email transmission may resume and the flowchart 430 may end. In alternate embodiments, other conditions may be examined prior to the resuming of the transmission of the email.

If at step 442 it is determined that at least one senders/recipients user matches any flagged user, at step 446 the list of senders/recipients may be displayed. In an alternate embodiment, the one or more senders/recipients determined to match the one or more flagged users, may be displayed in a different color/with different marking to make their visual identification easier. In another possible embodiment, the senders/recipients user list may be displayed such that at least one of the senders/recipients matching the one or more flagged users automatically becomes visible to the user, e.g. via automatically scrolling the displayed list of the senders/recipients.

At step 448, user input may be obtained to determine whether to resume the transmission of the email. In this example the user's input is binary: send the email or cancel sending the email. In alternate embodiments, the user may be presented with more options. If at step 450 it is determined the user input is a selection to send the email, at step 444 the email transmission may be resumed. If at step 450 it is determined the user selection is to cancel the email transmission, at step 452 the email transmission may be cancelled.

Figure 4C:
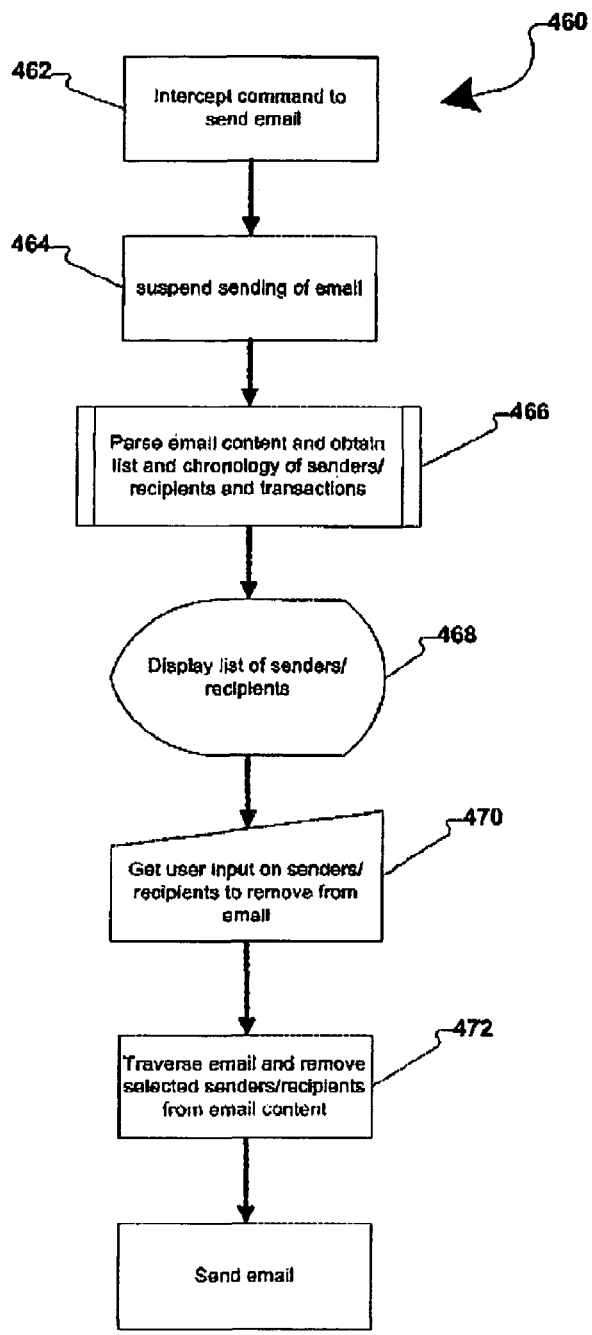

Referring now to FIG. 4C, in flowchart 460, the user may be able to remove one or more of the senders/recipients from the email prior to email transmission. At step 462, a command to commence the sending of the email (e.g. the user clicking a "send" button) may be intercepted. At step 464, the transmission of the email may be suspended.

At step 466, the email may be parsed to discern senders/recipients and the chronology of transactions-from the contents of the email. Various methods, discussed in other figures, may be used to discern the senders/recipients user-related information and transactional information from the email.

At step 468, the senders/recipients user-related information and the transactional information may be displayed to the user. In various embodiments, discussed throughout this document, the information may be displayed to the user as graphics, or text, or a combination, in a pop-up window, in a separate instance of a browsing application, etc.

At step 470, input front the user may be received to determine which one or more of the senders/recipients are to be deleted from the email. For example, the user may select the one or more senders/recipients to be deleted by clicking on the senders/recipients user's name, highlighting the senders/recipients user's name and choosing a delete function, etc.

At step 472, the email may be scanned for one or more occurrences of the selected senders/recipients user. In one embodiment, the a text-based search for an exact match with the name of the selected senders/recipients user may be performed, and all occurrences of a string of characters similar to the select senders/recipients user name, may be deleted (or replaced with a null character.) In another embodiment, all related emails (i.e. displayed as content in the body of the email) sent by the selected senders/recipients user, as well as all content added by the senders/recipients user, may be deleted from the email.

In yet another embodiment, all instances referencing the selected senders/recipients user's name in the email may be highlighted (or otherwise delineated) allowing the user to traverse all the occurrences and decide which occurrences should be deleted (e.g. all the occurrences may be highlighted and the user may use an input function, such as a tab key, to skip from one highlighted occurrence to the next, and issue a command, such as a delete key, to delete the highlighted occurrence.)

Figure 4D:
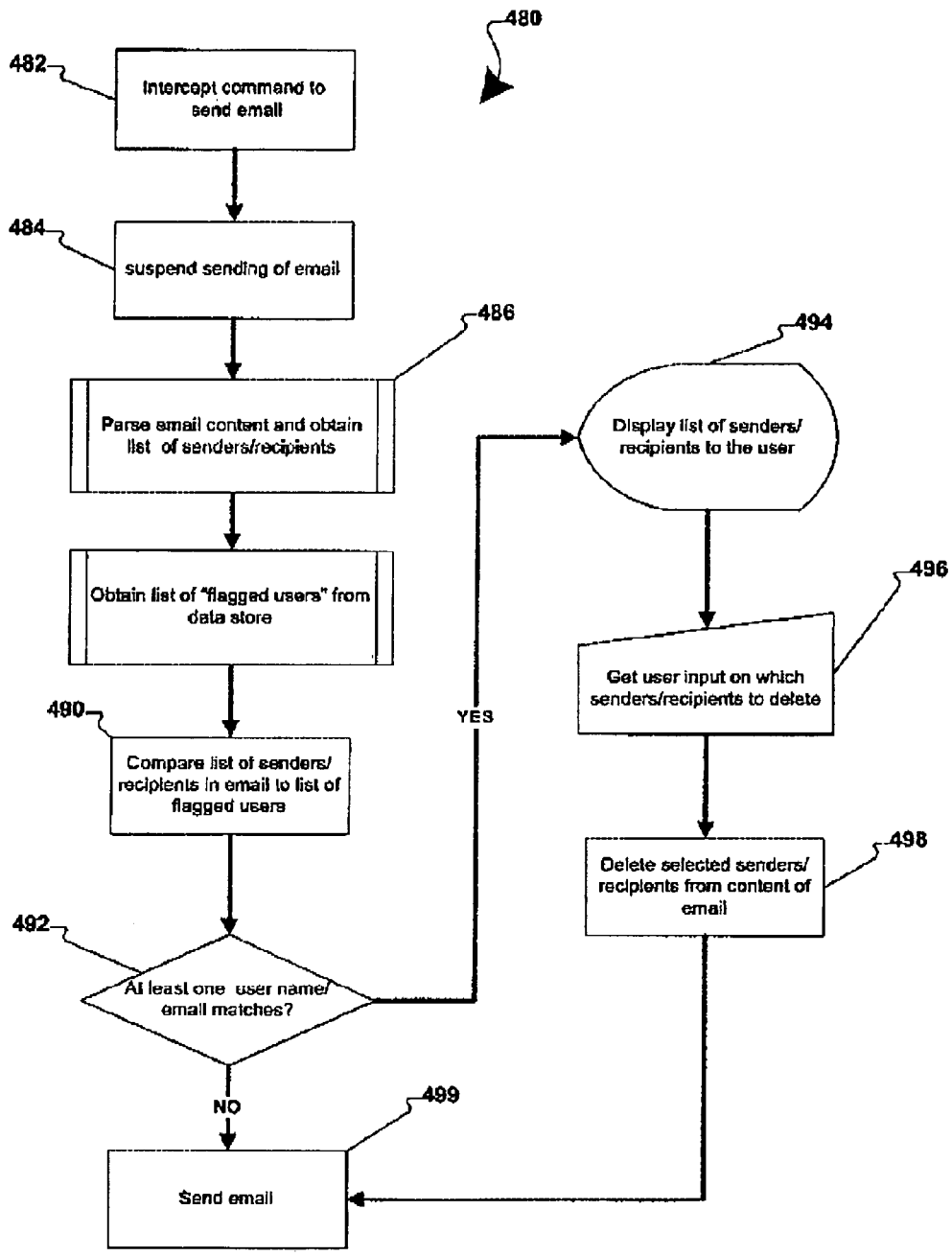

Referring now to FIG. 4D, in flowchart 480, a list of senders/recipients in an email, who match users in a list of flagged users, may be displayed prior to sending the email. The user may be able to delete one or more of the senders/recipients on the list.

At step 482 the transmission of the email may be intercepted (e.g. a command to send the email may be detected) and at step 484, the transmission of the email may be suspended. At step 486 the content of the email may be parsed to delineate the senders/recipients and the chronology of email transactions, captured within the body of the email.

At step 490, the list of senders/recipients may be compared with the stored list of flagged users, searching for an occurrence of one or more similar user name/emails in both lists. If at step 492 it is determined that at no occurrences exist, at step 499 the email transmission may be resumed and this flow may end.

If it is determined at step 492 that the name/email of at least one user appears on both the senders/recipients list and the flagged users list, at step 494 the list of the at least one matching user name/email address, may be displayed. At step 496, the user may select, from the display of the matching user names/email addresses, one or more senders/recipients to be removed from the contents of the email. The selection may be made via a pointing device, voice command, from a menu, etc.

At step 498, the one or more selected senders/recipients may be deleted from the content of the email. In various embodiments, various methods for deleting senders/recipients may be used. For example, the names and/or email address of the selected senders/recipients may be deleted; and/or any modification to the contents of the email made by the selected senders/recipients may be deleted; and/or any related emails, captured within the body of the email and containing a reference to the selected senders/recipients, may be deleted, etc.

At step 499, the email transmission may resume. The flowcharts illustrated in FIGS. 4A-4D illustrate various steps related to the core functionality of this invention. It is understood that many other steps common in email processing-possibly skipped in this discussion in order to keep the description of this invention within scope-may be utilized as part of an email system, in an implementation of this invention.

Figure 5A:
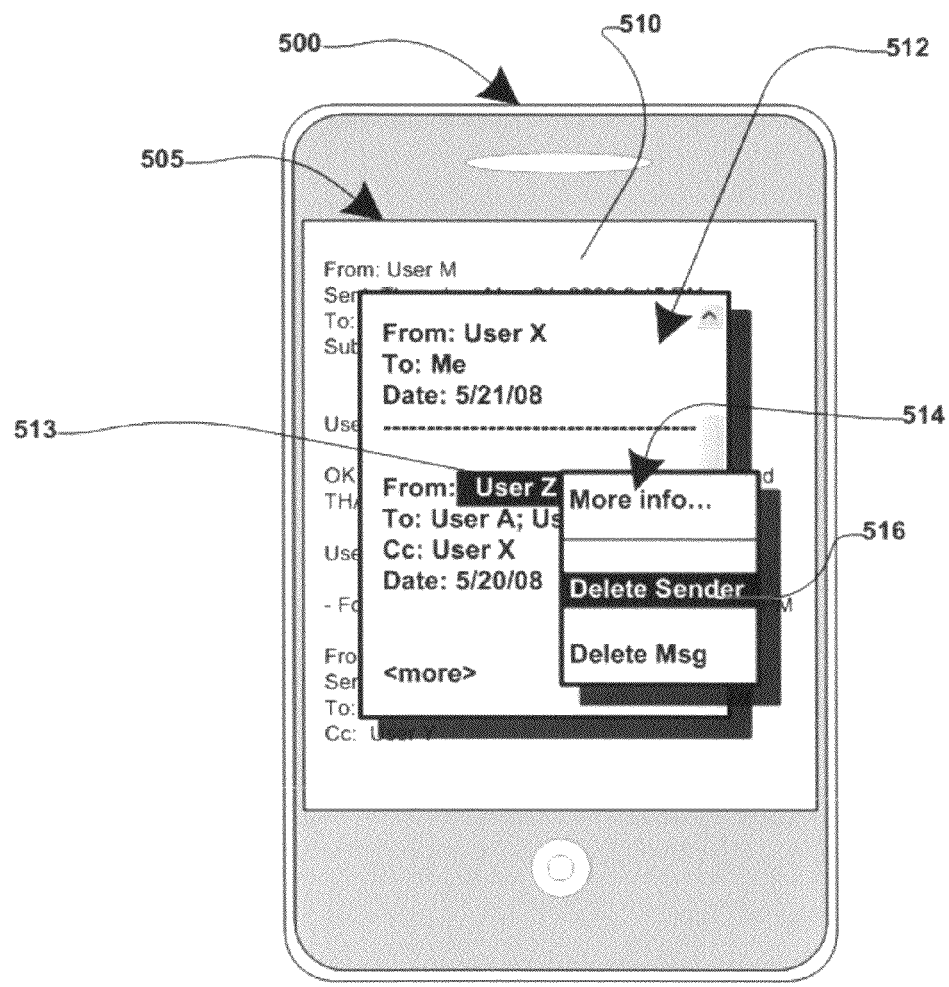
FIGS. 5A, 5B, and 5C are generalized flow diagrams illustrating functionality related to senders/recipients of an email and to displaying an email-thread chart, according to various embodiments of the present invention.
Figure 5B:
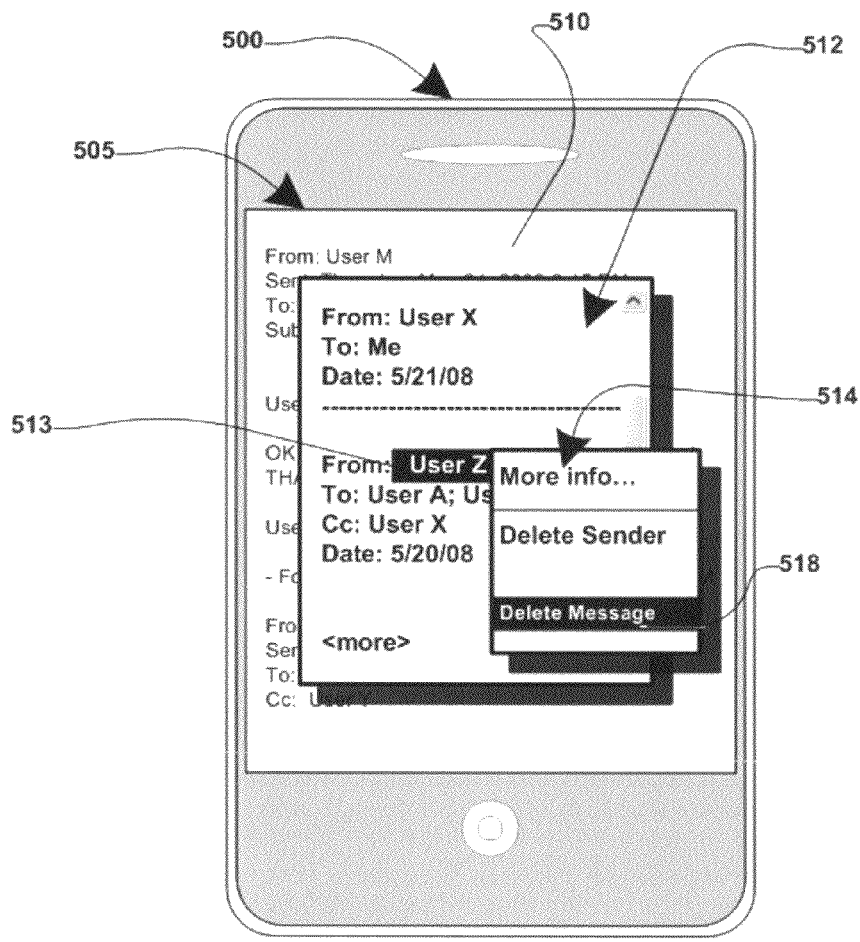
Figure 5C:
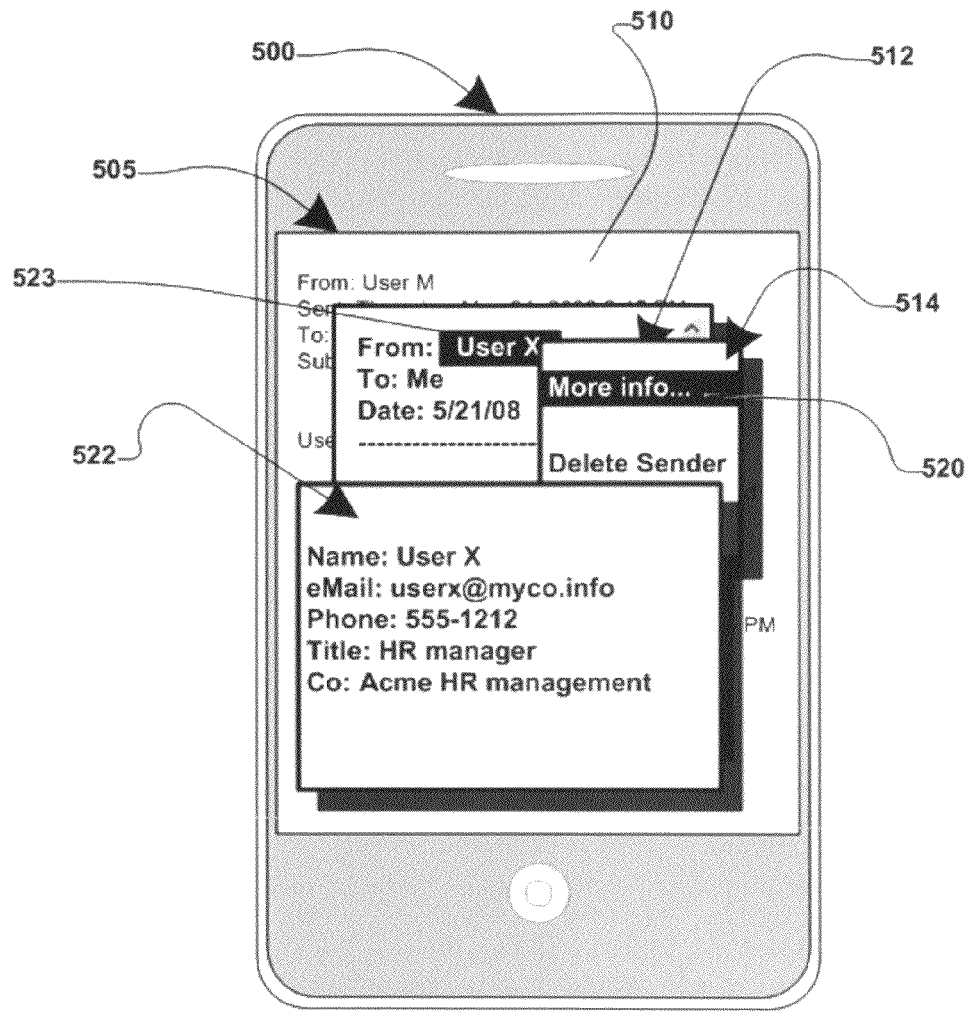

FIGS. 5A, 5B, and 5C are generalized flow diagrams illustrating functionality related to senders/recipients of an email and to displaying an email-thread chart, according to various embodiments of the present invention. The email-thread chart may be displayed on a display of an electronic device. The user may be offered functionality related to the email-thread chart.

Referring to FIG. 5A, an electronic device 500 (e.g. a mobile electronic device enabled for email) may display an email 510 on a display 505. The email 510 may contain information on senders/recipients who have sent and received various earlier email threads related to the email 510, among themselves. A chronology of the email sending-and-receiving ("email transactions") may also be included in the email 510.

An email-thread chart 512 may be displayed on the display 505. In various embodiments, the email-thread chart 512 may be a pop-up window, a browser, a widget, an application/browser snapin, a control/application-component such as a listbox or a textbox, etc. The email-thread chart 512 may display the senders/recipients and information on the email transactions.

The user may select an email item (e.g. a name/email of a sender/recipient, a date of a transaction, etc.) displayed in the email-thread chart 512. In one embodiment, the selection may be made with a pointing device, such as a mouse, a stylus or via touching the screen of the device 500 to indicate the selection, via a voice-command, etc. In an alternate embodiment, the selection may be made by a roller-type selection control on the device 500 where, in response to a user's toggle of the rolling selection control, the next (or previous, depending on the direction of the rolling) email item may be selected automatically.

In response to selecting an item "User Z" 513, a context menu 514 may be displayed. The context menu 514 may contain one or more functions to be performed in relation to the selected email item "User Z" 513. The number of functions, and their purpose, may vary by the email item selected (e.g. selection an item that is the name of a user may cause different functions to display on the context menu 514, as compared to selecting an email item that is a date.) The functions and their content may also vary in different possible embodiments.

Selecting the context menu 514 function "Delete Sender" 516, may cause the selected email item (in this example "User Z" 513) to be deleted from the email 510. In one embodiment, all text referencing senders/recipients in the email 510, containing the string of characters matching the selected email item "User Z" 513, may be deleted. For example, a recipient line in the email 513 containing "Send to: User X; User Y; User Z; me" may be replaced by "Send to: User X; User Y; me", where the text "User Z" is deleted.

In an alternate embodiment, all text in the email 510, containing the string of characters matching the selected email item "User Z" 513, may be deleted. For example, a line in the email 513 containing text "Please forward the document to User Z and Jack" may be replaced by "Please forward the document to Jack". In yet another possible embodiment the function "Delete Sender" 516 may be analogous to a "search and replace" function in word processing in the prior art, where the user is given a choice to replace a single instance of the occurrence of a word, or replace all instances, or replace all instances in a selected text, etc.

Referring now to FIG. 5B, a function "Delete Message" 518 may be displayed on the context menu 514. The function "Delete Message" 518 may delete one or more messages from within the email 510, sent or received by the selected user "User Z" 513. In one example, the email 510 may contain a record of three related emails, in an email thread, sent among users. If the second email was sent by "User Z" 513, all content related to the second email may be removed from the email 510 in response to the "Delete Message" 518 function, invoked in conjunction with the selection of "User Z" 513. In alternate embodiments, other functionality may be associated with the function "Delete Message" 518.

Referring now to FIG. 5C, the context menu 514, displayed in conjunction with a selected email item "User X" 523, displayed in the email-thread chart 512, may include a function "More info . . ." 520. The function "More info . . ." 520 may cause additional information associated with the selected email item 523, to be displayed. In this example, the selected email item "User X" 523 is a user of a related email, included in the email 510. In response to the invocation of the function "More info . . ." 520, additional information 522, associated with the user "User X" 523, may be retrieved and displayed.

The additional information 522 may include, for example, the user "User X"'s 523 contact information such as full name, email address, contact telephone numbers, address, company and title, etc. The additional information 522 may be retrieved from email applications such as Microsoft Outlook®, GMail® etc., from email servers, from corporate directory services and data stores, etc.

In alternate embodiments, other functionality may be associated with an email-thread chart. In one possible embodiment, the user may select a block/node of the email-thread chart containing information. In response, an email thread, associated with the email-thread chart, may be displayed to the user in a manner making the selected information visible. For example, the user may select from the email-thread chart a node/block with the name of an email sender, and in response, the email thread may be displayed scrolled in such manner as to make the text including the name of the selected email sender, visible to the user.

Figure 6A:
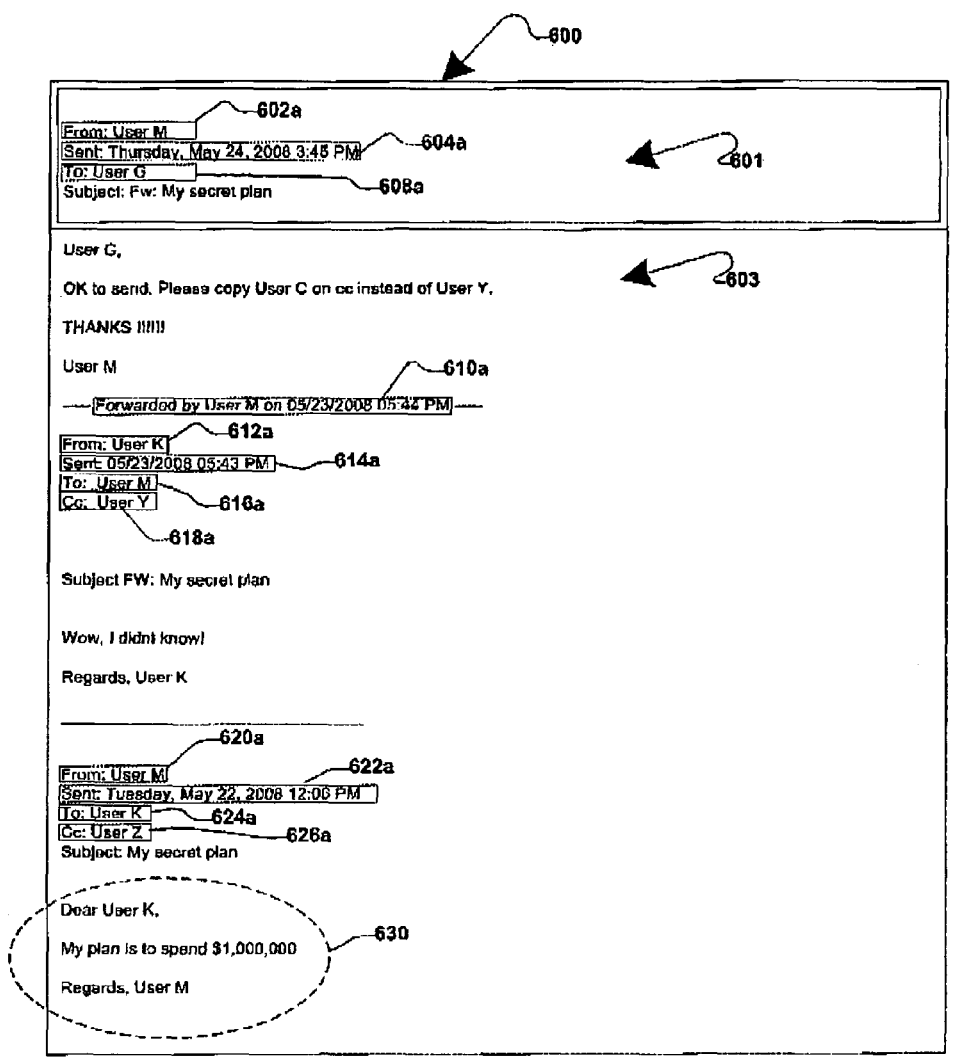
FIGS. 6A, 6B and 6C are a generalized block diagrams illustrating discerning senders/recipients and chronology information from an email, according to one embodiment of the present invention.
Figure 6B:
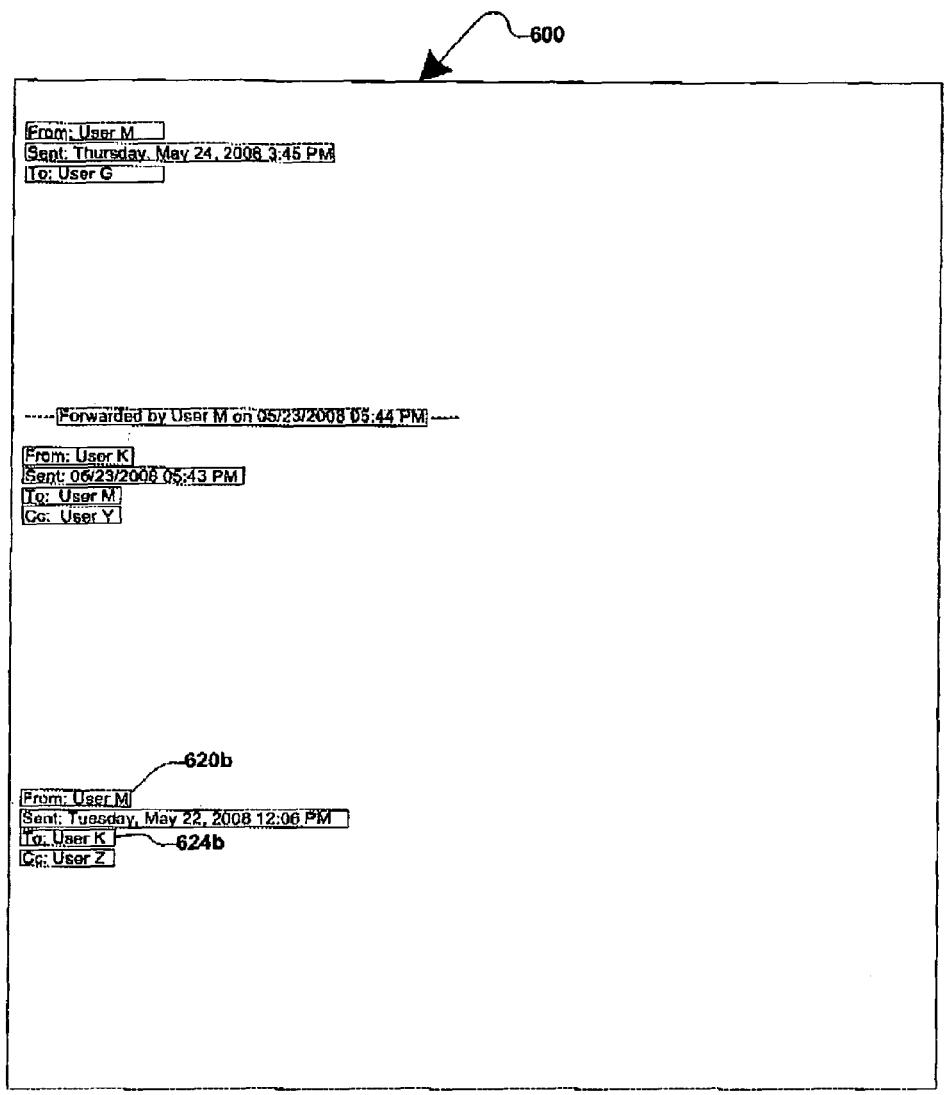
Figure 6C:
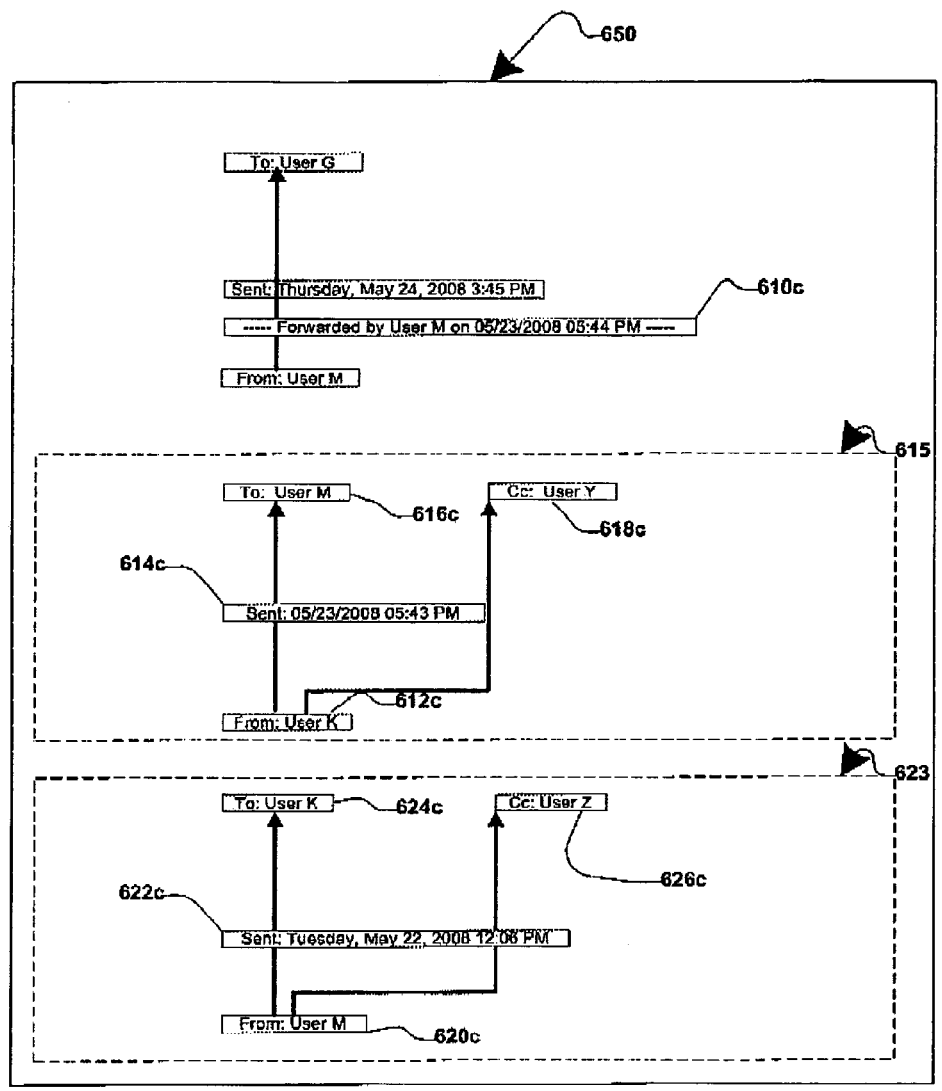

FIGS. 6A, 6B and 6C are a generalized block diagrams illustrating discerning senders/recipients and chronology information from an email, according to one embodiment of the present invention. An email may include a header and a body sections. The header section may contain information on the current senders and recipients of the email, while the body section may contain information including the senders/recipients and transactions in an email trail, including previously-sent related emails.

Referring now to FIG. 6A, an email 600 may contain a header section 601. The header section 601 may contain information on current senders and recipients of the email, for example, "From: User M" 602*a*, "To: User G" 608*a*, and a date-and-time stamp "Sent: Thursday, May 24, 2008 3:54 PM" 604*a*.

The body section 603 of the email 600 may contain transactional information recorded by previous, related emails sent and received among senders/recipients. For example, in a commonly-used most-recent-to-least-recent chronology, the earliest transactional information may be at the bottom of the email: "From: User M" 620*a*, "To: User K" 624*a*, "Cc: User Z" 626*a*, "Sent: Tuesday, May 22, 2008 12:06 PM" 622*a*.

The second transaction included in the body 603 of the email 600 may be indicated by a second set of legacy user fields (second from the bottom): "From: User K" 612*a*, "To: User M" 616*a*, "Cc: User Y" 618*a*, "Sent: 5/23/2008 05:43 PM" 615*a*. Additional text, such as "----- Forwarded by User M on 5/23/2008 05:44 PM -----" 610*a*, may also be identified and utilized in the display of an email-thread chart.

A third transaction may be included in the header 601 of the email 600 and may be delineated by a third set of legacy user fields (third from the bottom): "From: User M" 602*a*, "To: User G" 608*a*, "Sent: Thursday, May 24, 2008 3:45 PM" 604*a*.

Non-transactional information 630 (i.e. information not pertaining to the senders/recipients or transactions of the email) may also be included in the email 600.

Referring now to FIG. 6B, all content of the email 600, which is not related to the transactions among the senders/recipients of the email, may be disregarded. The remaining transactional content may include all the sender/recipient fields (e.g. including the "From:", "Sent:", "To:", "Cc:", "--- Forwarded . . . ." Fields, etc.) from FIG. 6A.

Referring now to both FIG. 6B and FIG. 6C, a graphical representation ("email-trail chart") 650 of the transactions included in the email 600 in FIG. 6B, may be constructed. The email-trail chart 650 may include sender names (e.g. "From: User M" 620*c*, which may be derived from the field "From: User M" 620*b* in FIG. 6B, etc.), recipient names (e.g. "To: User K" 624*c*, which may be derived over from the field "To: User K" 624*b* in FIG. 6B, etc.), and date/timestamps (e.g. "Sent: Tuesday, May 22, 2008 12:06 PM" 622*c*, which may be derived from the field "Sent: Tuesday, May 22, 2008 12:06 PM" 622*b* in FIG. 6B, etc.)

The sender/recipient names in the email-trail chart 650 may be arranged in a manner related to the order of transactions included in the email 600 (FIG. 6A). For example, User M 620*c* sending an email to User K 624*c*, and CCing User Z 626*c*, on Tuesday, May 22, 2008 12:06 PM 622*c*, may be determined to comprise a first transaction 623 (in FIG. 6C). User K 612*c* sending an email to User M 616*c*, and CCing User Y 618*c*, on May 23, 2008 05:43 PM 614*c*, may be determined to comprise a second transaction 615. In the presently-preferred embodiment, the first transaction 623 (determined to be chronologically first by the date/time stamp 622*c*), may be displayed underneath the second transaction 615 (determined to be chronologically second by the date/time stamp 614*c*) In alternate embodiments, the transactions 615 and 623 may be displayed in different orders. Arrows may connect the senders and the recipients, further assisting in demonstrating the direction of a transaction (i.e. the arrows may point from senders to respective recipient.)

The email-trail chart 650 may include all text in the original email 600 (FIG. 6A) which may be considered pertinent to constructing the email-trail chart 650: the names of the senders, the names of the recipients, the date/time stamps, transaction-related text (e.g. "----- Forwarded by User M on 05/23/2008 05:44 PM -----" 610*c*), etc. In alternate embodiments, more information, or less information and/or other information may be displayed in the email-trail chart 650.

FIGS. 7A, 7B, 7C and 7D are a generalized block diagrams illustrating detecting and displaying senders/recipients and chronology information included in an email, according to one embodiment of the present invention. The GUI (Graphical User Interface) of email services such as GMail®, may display an email thread as hidden text and as quoted text within an email. Senders/recipients and transactions chronology information may be identified within the hidden text and quoted text, and may be displayed as a chart.

Figure 7A:
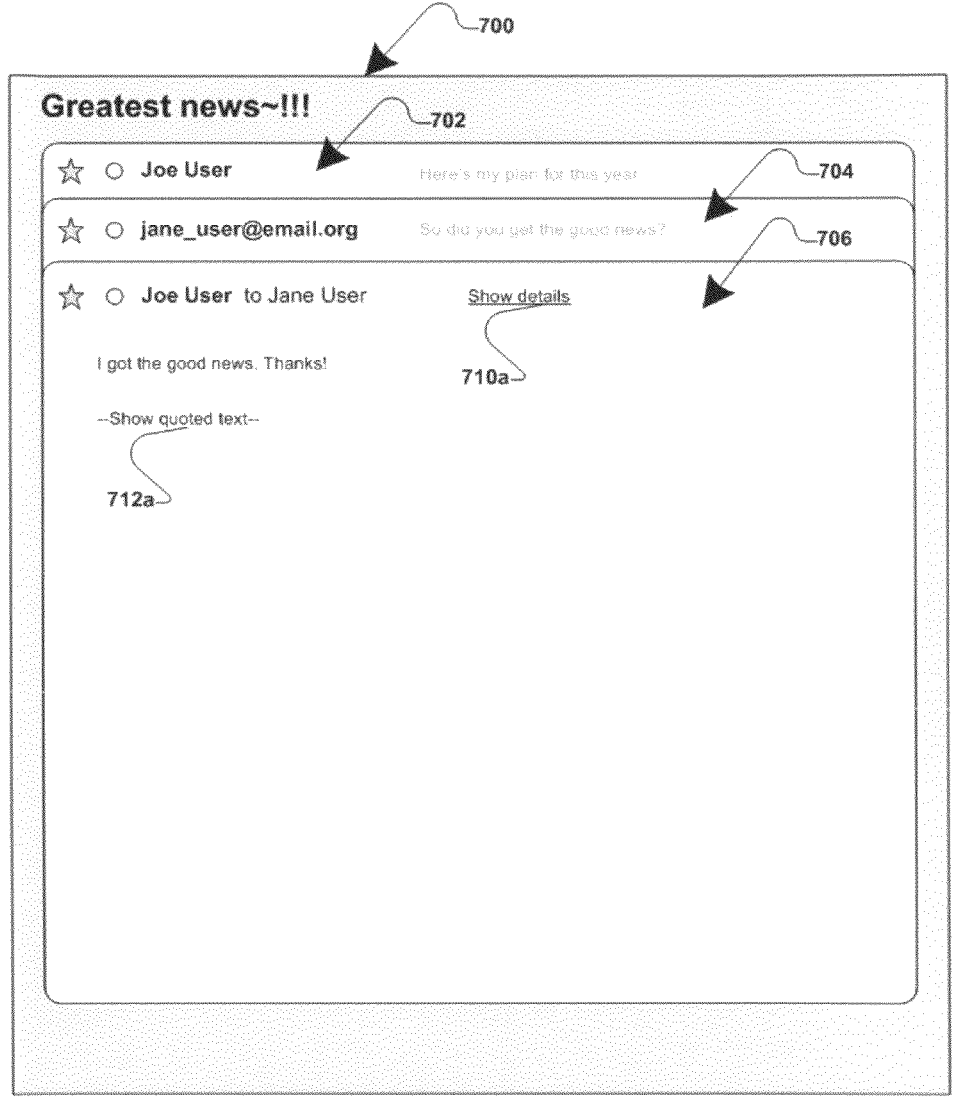
FIGS. 7A, 7B, 7C and 7D are a generalized block diagrams illustrating detecting and displaying senders/recipients and chronology information included in an email, according to one embodiment of the present invention.

Referring to FIG. 7A, an email container 700 may include multiple related-email views 702, 704 and 706 of an email thread. In the prior art, a foremost related-email view 706 may contain the most recent email that is part of the email thread, whereas the other related-email views 704 and 702 may contain earlier emails contained in the email thread. Various portions of the email thread may be hidden from view (e.g. to de-clutter, or simplify the presentation of the email.) Hidden portions of the email thread may be denoted by text, such as "--Show quoted text—" 712a and "Show details" 710a.

In the prior art, the hidden portions of the email thread may be made visible by selecting (e.g. clicking) the text denoting the hidden portions. For example, a user's selecting the text "Show details" 710a (referring now to FIG. 7B) may cause transaction-related text (e.g. a complete list of senders and recipients of the email in the related-email view 706), to be displayed. For example, "from: Joe User to Jane User" 730, "to: jane_user@email.org" 732, "cc: bob_user@email.org" 734, "date: Thu, Jun. 26, 2008 at 4:09 PM" 736, and "subject: Re: Greatest news~!!!" 738, may be displayed. Selecting "Hide details" 710b may cause the transaction-related text 730, 732, 734, 736 and 738 to become hidden.

The transaction-related text 730, 732, 734, 736 and 738 may be used to construct an email-thread chart. Referring also to FIG. 7D, an email-thread chart 760 may contain information included in the transaction-related text 730, 732, 734, 736 and 738 of FIG. 7B. For example, the blocks "Joe User" 762, "Jane_user@email.org" 766 and "bob_user@email.org" 767 may be derived from the transaction-related text 730, 732, and 734, respectively.

Figure 7B:
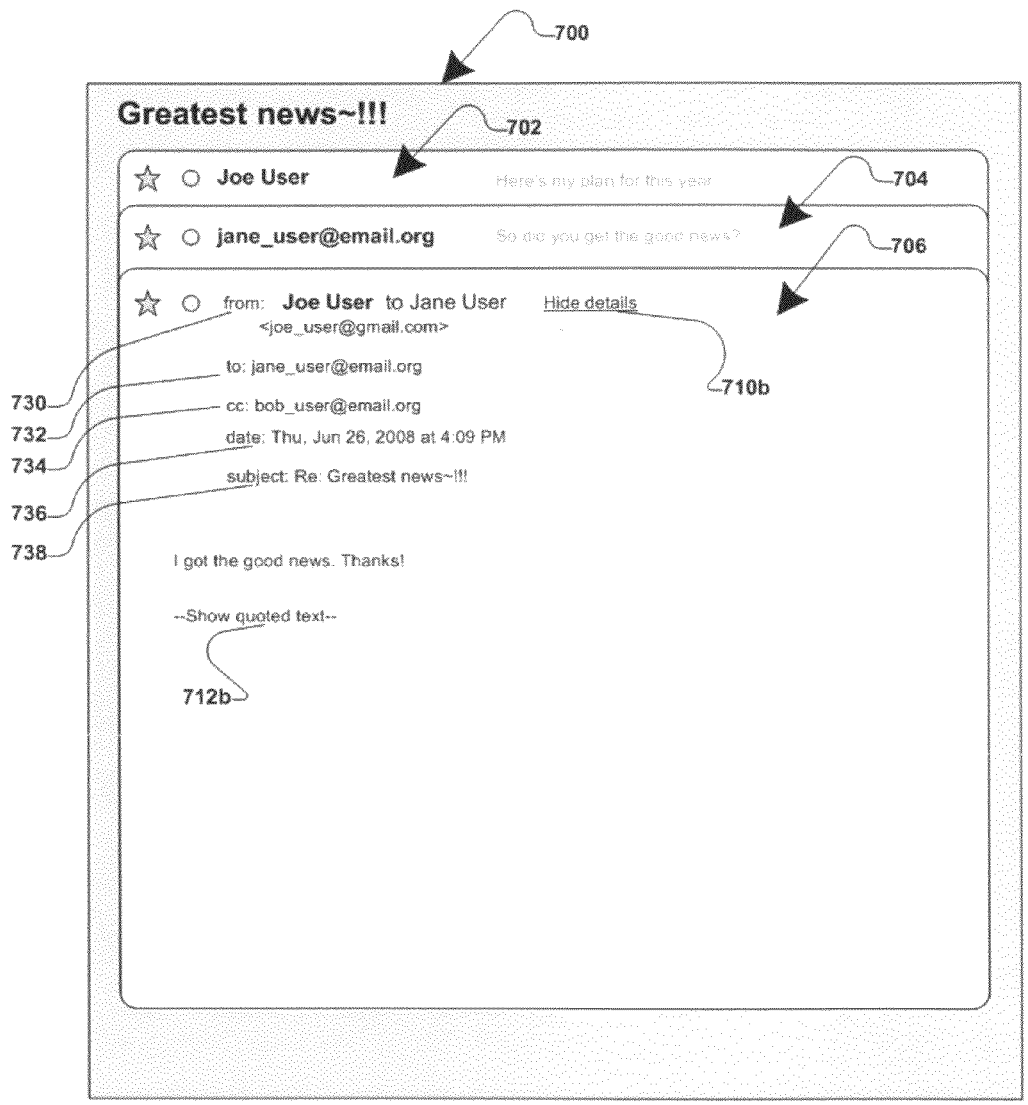
Figure 7C:
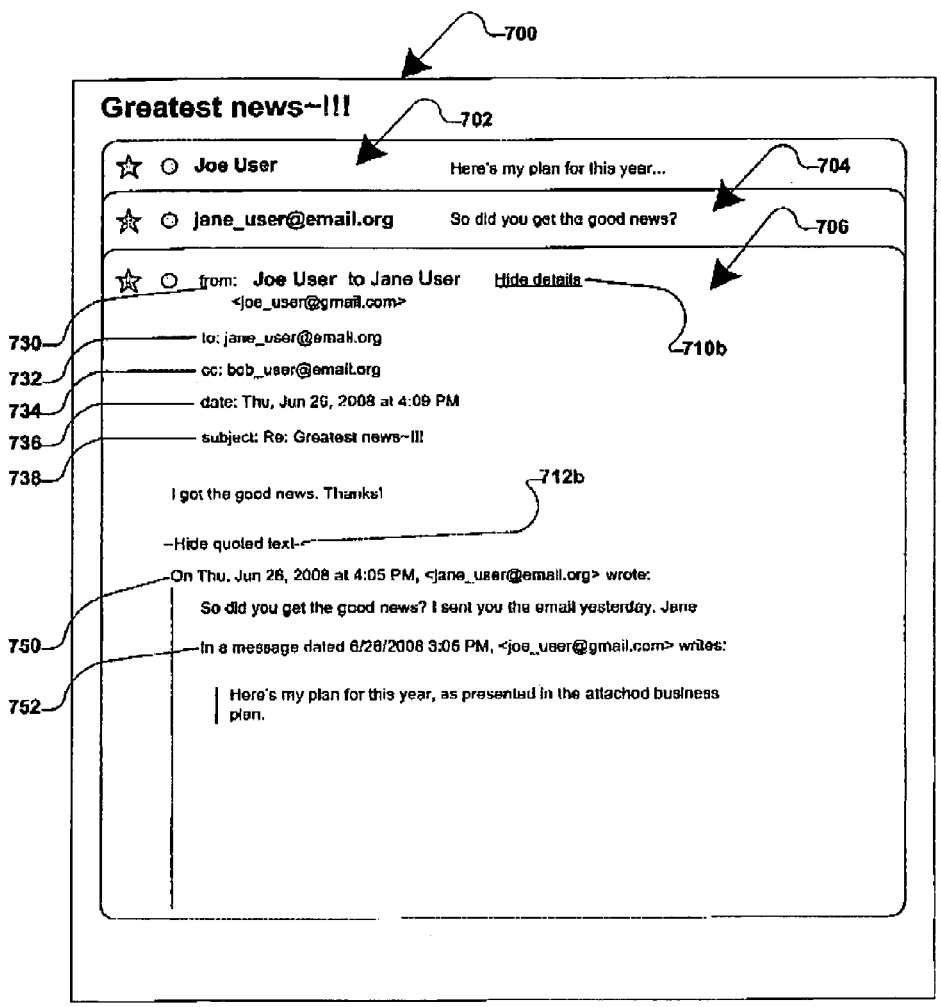
Figure 7D:
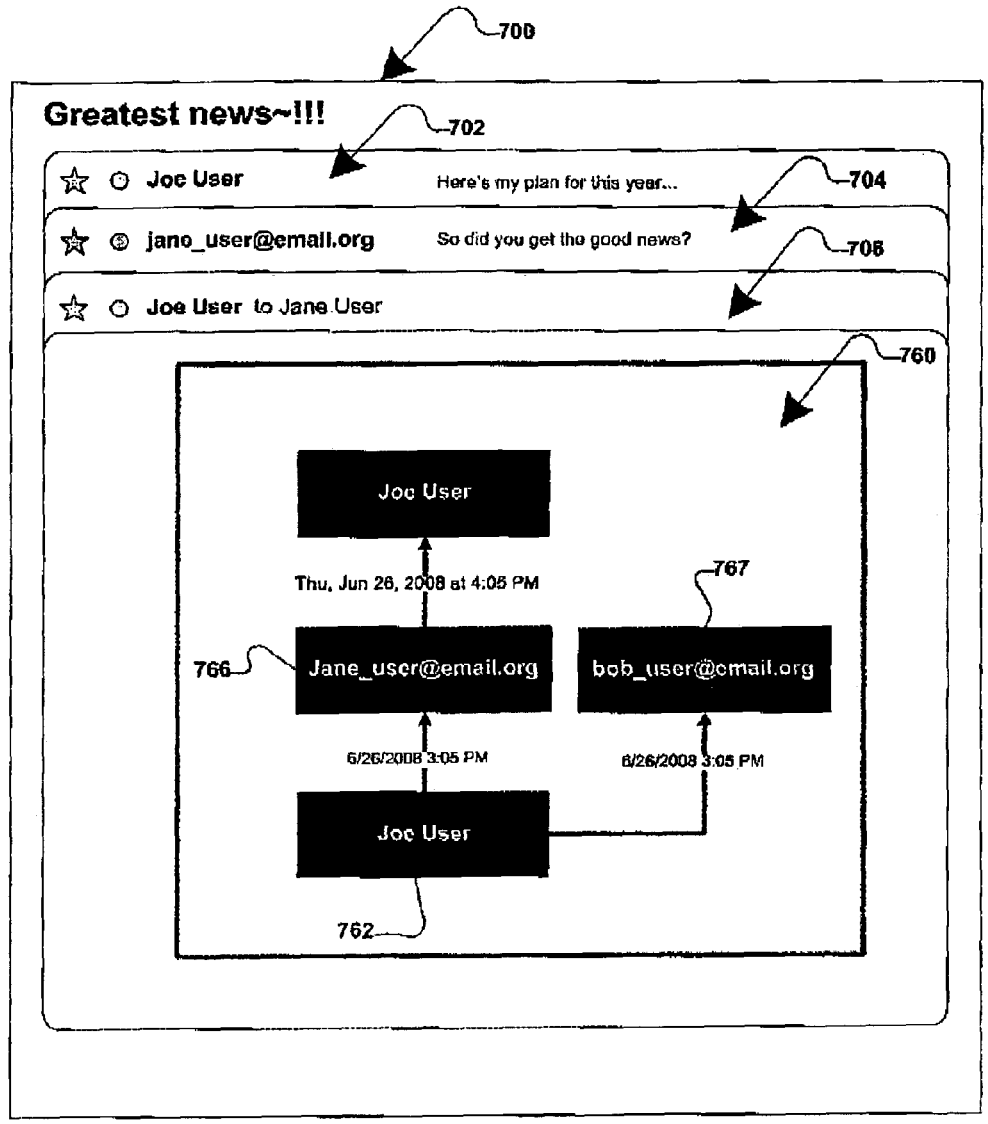

Referring now to FIG. 7B, selecting the text "--Show quoted text—" 712a may—referring now to FIG. 7C—display additional transaction-related email-thread text, previously hidden. In this example, the transaction-related email-thread text "On Thu, Jun. 26, 2008 at 4:05 PM, <jane_user@email.org> wrote:" 750 and "In a message dated 6/26/2008 3:05 PM, <joe_user@gmail.com> writes:" 752 may be displayed.

In the presently-preferred embodiment of this invention, the transaction-related text 750 and 752 in FIG. 7C may be exposed automatically (e.g. by programmatically selecting the text "--Show quoted text—" 712a in FIG. 7A, causing the transaction-related text to display.) After the transaction-related text 750 and 752 in FIG. 7C has been processed, the text "--Hide quoted text—" 712b may be selected programmatically, causing the transaction-related text 750 and 752 to become invisible.

Referring now to FIGS. 7C and 7D, the transaction-related text 750 and 752 may be used in the email-thread chart 760. In the examples depicted in FIGS. 7A-7D, a specific style and convention of displaying emails, used in the prior art, is shown. For example, various email text is hidden and may be unhidden by controls, portions of an email thread are displayed as different tabs, etc. In alternate embodiments, various other conventions and methodologies of displaying email may be used, from which an email-thread chart may be constructed according to the principles of the present invention.

Please note that, while the examples above utilized specific key words such as "From:", "To:", "Cc:", "Sent:", etc. to delimit fields within an email to determine senders/recipients and transactions chronology, in alternate embodiments different key words may be used. For example, in non-English emails, key words in other languages may be used to delimit senders/recipients and transactions chronology. In alternate embodiments, various different key words may be used to delimit fields within an email to determine senders/recipients and transactions chronology. Key words used to determine senders/recipients and transactions chronology may be selected by a user, by an operating system (e.g. based on locale settings), by an email service, by an email display application, by an application displaying senders/recipients and transactions chronology information, etc.

While the invention has been described herein with reference to certain preferred embodiments, these embodiments have been presented by way of example only, and not to limit the scope of the invention. Accordingly, the scope of the invention should be defined only in accordance with the claims that follow.

What is claimed is:

1. A method for allowing a user to review and modify an email prior to its transmission, comprising:
   providing an electronic device having an email application that is coupled to a network and contains the email which includes an email-thread;
   detecting an invocation of an email transmission-related function in the email application;
   suspending transmission of the email;
   creating an email-thread chart, wherein the email-thread chart contains information on people referenced within the email-thread;
   displaying the email-thread chart to the user;
   receiving user input selecting at least one person in the email-thread chart;
   receiving user input to delete all portions of the email-thread related to the selected at least one person;
   deleting said all portions of the email thread related to the selected at least one person; and
   resuming the transmission of the email.

2. The method of claim 1, wherein the selecting at least one person in the email-thread chart further comprises displaying a portion of the email-thread containing references to the at least one person.

3. The method of claim 1, wherein the selecting at least one person in the email-thread chart further comprises retrieving and displaying additional information pertaining to the at least one person in the email-thread.

4. The method of claim 1, further comprising: prior to deleting the all portions of the email thread, displaying to the user the at least the portion of the email thread about to be deleted.

5. The method of claim 1, further comprising maintaining a list of one or more people and delineating the one or more people on the list in the email-thread chart.

6. The method of claim 1, wherein the invocation of an email transmission-related function is detected by functionality external to the email application.

7. The method of claim 1, wherein the email transmission-related function is "send".

8. The method of claim 1, wherein the email-thread chart contains an email address of at least a person included in the email thread.

9. The method of claim 1, wherein the email-thread chart contains a name of at least a person included in the email thread.

10. The method of claim 1, wherein the email-thread chart contains an email alias of at least a person included in the email thread.

11. The method of claim 1, wherein the email-thread chart contains a date and time stamp of at least an email included in the email thread.

12. The method of claim 1, wherein the email-thread chart further comprises one or more nodes, wherein each node represents a single occurrence of an element in the email-thread.

13. The method of claim 12, wherein the one or more nodes contain a reference to a person within the email-thread.

14. The method of claim 12, wherein the email-thread chart represent a relationship between two or more of the nodes.

* * * * *